Oct. 15, 1940.  G. S. SPAKE  2,218,057
SETUP BOX SHAPER
Filed Sept. 26, 1939 5 Sheets-Sheet 3
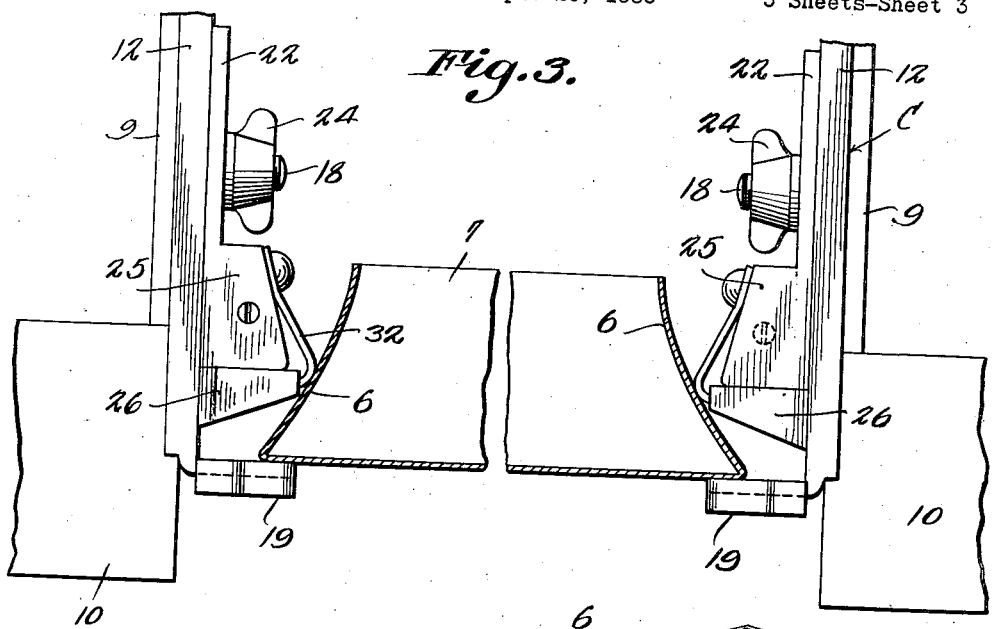
G. S. Spake
INVENTOR.
BY
ATTORNEYS.

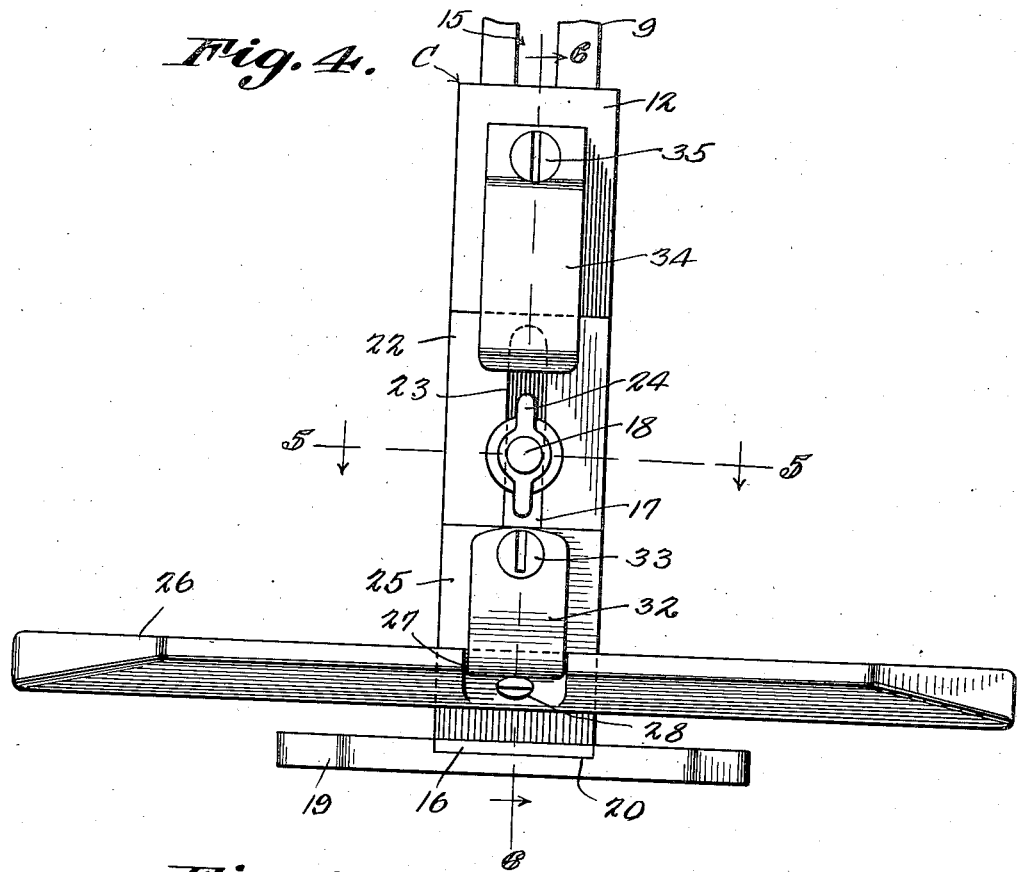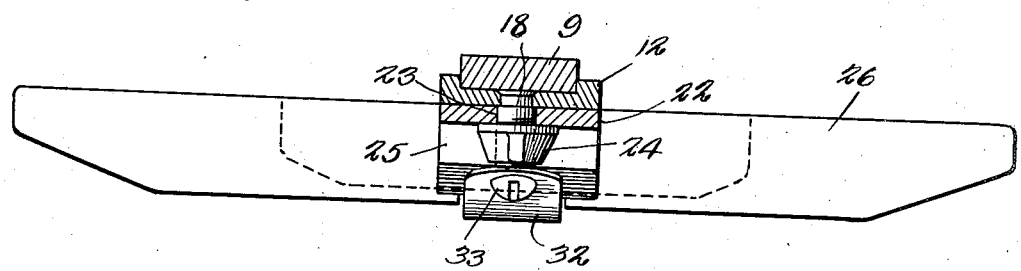

Oct. 15, 1940.                G. S. SPAKE                 2,218,057
                            SETUP BOX SHAPER
                         Filed Sept. 26, 1939            5 Sheets-Sheet 5
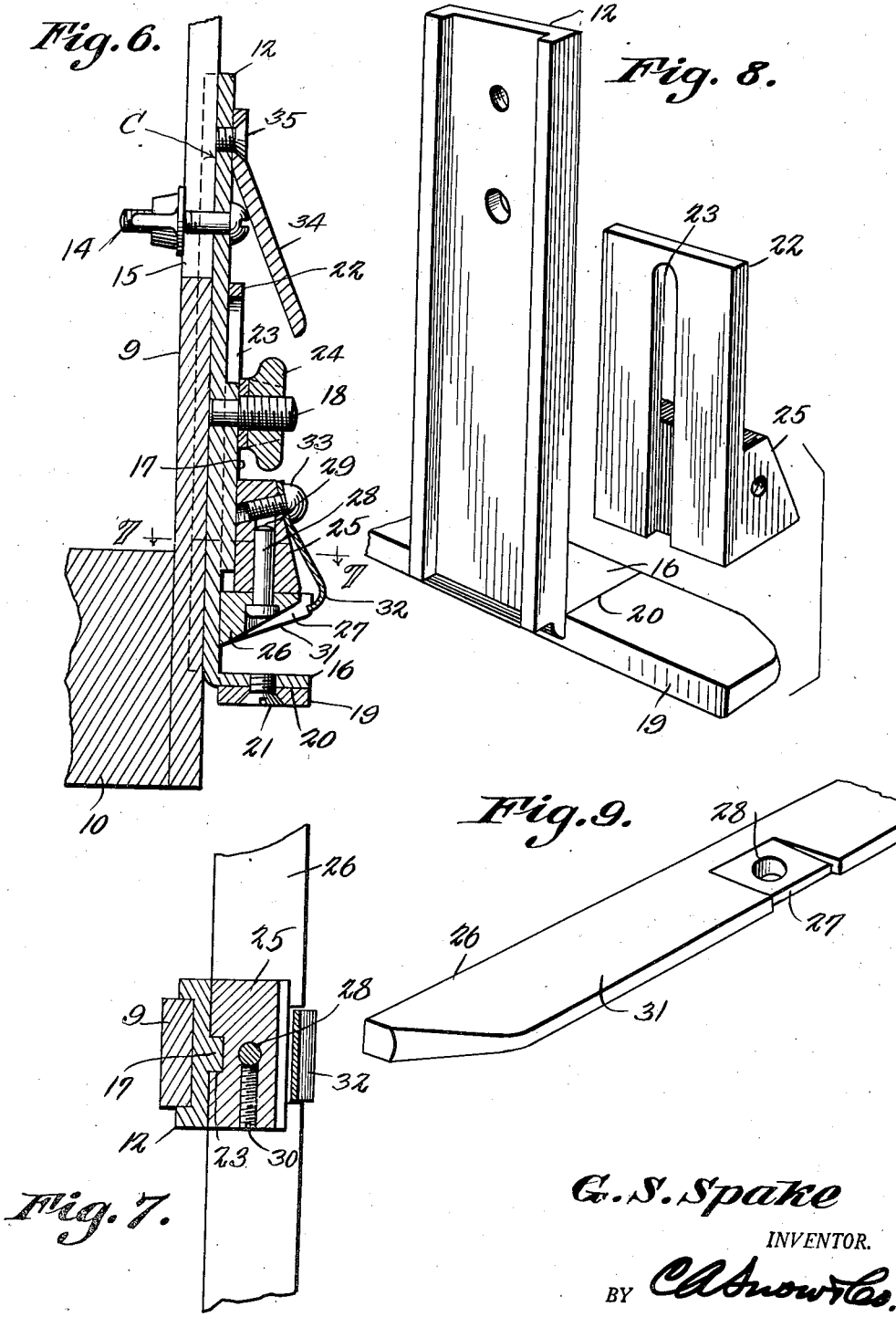
G. S. Spake
INVENTOR.
BY C. A. Snow & Co.
ATTORNEYS.

Patented Oct. 15, 1940

2,218,057

UNITED STATES PATENT OFFICE 2,218,057

SETUP BOX SHAPER

George Samuel Spake, Marietta, Ga.

Application September 26, 1939, Serial No. 296,697

5 Claims. (Cl. 93—53)

A box, made of pasteboard, or the like, and constructed in a standard box-forming machine, should have its upright walls or flanges at right angles to the bottom of the box, when the box is finished. Such a construction is shown in Fig. 11. When crimpers of known constructions are used, the walls or flanges of the box belly out, as shown in Fig. 12.

This invention aims to provide a crimper which will turn out a box as shown in Fig. 11. Another object of the invention is to provide a crimper which will not only push in the flanges of an upper box, but, as well, push in and down on top of the next box therebelow, thereby forcing downwardly, out of the machine, one of a plurality of superposed boxes.

Another object of this invention is to enable box-makers to turn out perfectly shaped boxes of any thickness of paper board without changing or re-setting the machine.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is a transverse section disclosing the crimpers in relation to the box, during the operation of crimping;

Fig. 4 is an elevation of the crimper, parts being broken away;

Fig. 5 is a section on the line 5—5 of Fig. 4;

Fig. 6 is a vertical section of the crimper;

Fig. 7 is a cross section on the line 7—7 of Fig. 6;

Fig. 8 is a perspective showing parts of the shaper spaced from each other;

Fig. 9 is a perspective of the crimper bar;

Fig. 10 is a perspective showing a portion of the crimper;

Fig. 11 is a perspective showing a perfect box of the kind that can be turned out with the crimper forming the subject matter of this application;

Fig. 12 is a perspective showing an imperfectly formed box, the view illustrating something which the crimper herein described obviates.

The device forming the subject matter of this application can be used on box making machines of various sorts, but by way of example, it is shown assembled with the machine disclosed in Patent 1,383,697, granted on July 5, 1921, to Charles C. Davis. Since a description of the structure of the machine, and of its operation as to details, forms part of the literature of the prior art, a brief summary will suffice for the purposes of this document. The term "box" designates either the body or the cover of a rectangular container, made of pasteboard or equivalent material.

Figure 2:
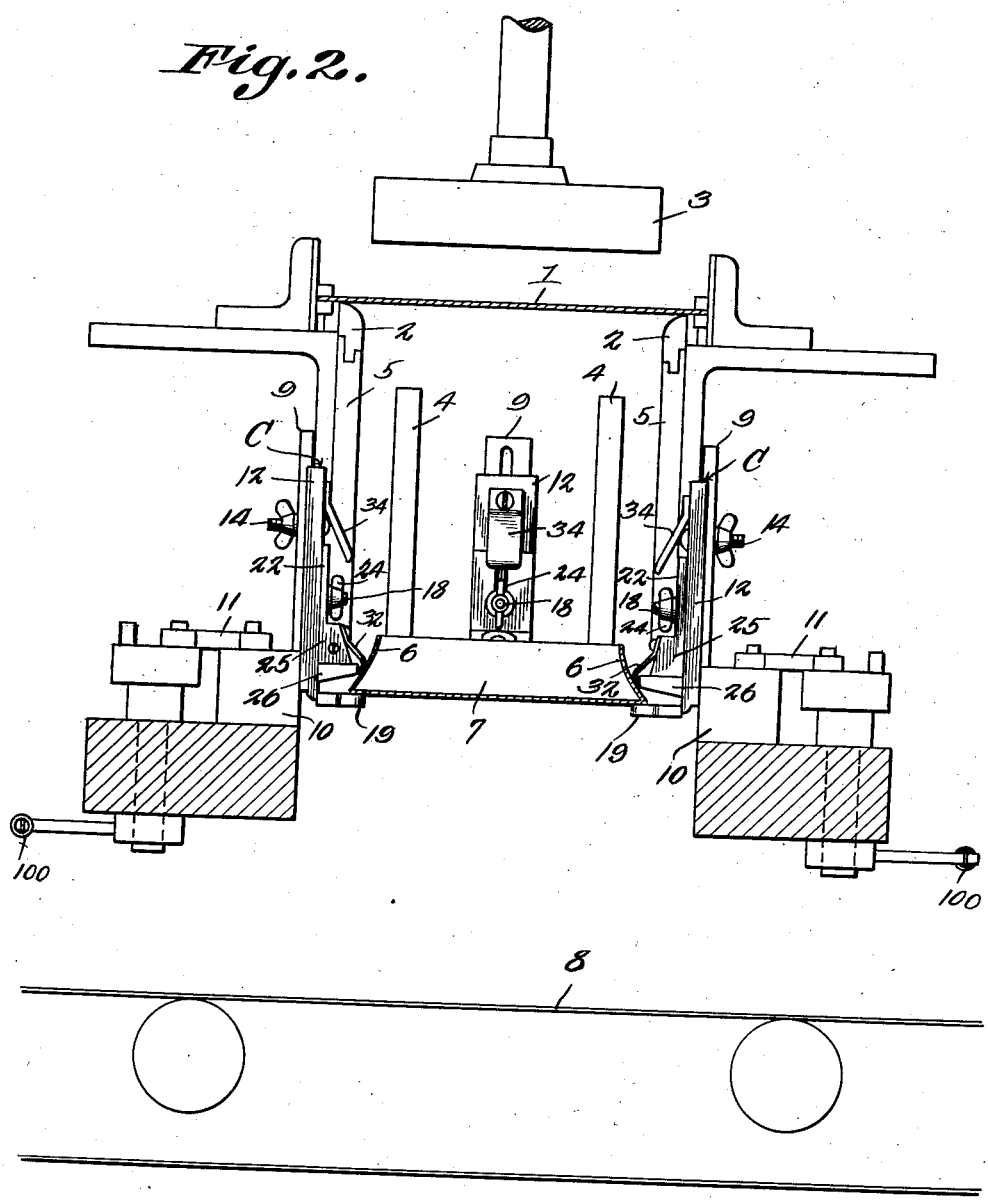
Fig. 2 is a vertical transverse section of a standard machine wherein the invention is incorporated, the view being somewhat diagrammatic as to certain features.

Referring to Fig. 2, a box blank 1 is supported on the bearing rods 2 of the machine. A former 3 descends, the blank 1 is forced downwardly within a rectangle defined by end breaker posts 4 and side breaker posts 5 (supporting the breaker rods 2), and the side flanges 6 and the end flanges 7 of the box are turned up.

When the former 3 carries the flanged box down, the box is corner-stayed, that being an operation the steps of which are not germane to the present disclosure. The former 3 rises out of the flanged box, the box being held against participation in the upward movement of the former. A plurality of superposed boxes remain within the field of operation of the machine, the lowermost box ultimately being freed and permitted to move downwardly upon a conveyor 8. Whilst the uppermost box is supported, the flanges 6 and 7 of the box are turned inwardly or crimped (Fig. 2), by the horizontal and inward movement of the crimpers C which characterize the invention.

The crimpers C are attached to vertical posts 9, the bases 10 of which are mounted for reciprocation on the framework of the machine, toward and from the vertical axis of the box which is being constructed. The parts 9—10 attain their reciprocation through the instrumentality of mechanisms 11, for which the known art furnishes ample disclosure.

Figures 6 to 10 detail the crimper C which constitutes, essentially, the subject matter of this invention. The crimper C comprises an upright, channel-shaped body 12, which receives the post 9, vertical adjustment of the body being possible, since it is connected to the post by a clamp bolt 14 (Fig. 6), having vertical adjustment in a longitudinal slot 15 in the post. The lower end of the body 12 of the crimper C is provided with a horizontal arm 16. The crimper body 12 is supplied with a longitudinal guiding rib 17, from which projects a transverse, threaded stud 18.

A horizontal rest plate 19 is provided, and is notched at 20 to receive the arm 16 of the crimper body 12, a securing element 21 joining the rest plate to the arm.

A carrier 22 has right line vertical adjustment on the crimper body 12, inasmuch as the carrier is provided with a longitudinal slot 23, which receives the rib 17 on the body. A wing nut 24, threaded on the stud 18 of the crimper body 12, binds the carrier 22 on the crimper body 12, in adjusted positions, vertically thereof.

The carrier 22 is supplied with a horizontal offset 25 at its lower end, overhanging the rest plate 19.

Disposed above the rest plate 19, in parallel relation thereto, is a crimper bar 26, which is somewhat longer than the rest plate. The crimper bar 26 abuts against the lower end of the carrier 22 and the offset 25 of the carrier. On its underside, and at its inner edge, the crimper bar 26 has a recess 27, there being a hole 28, in the crimper bar, within the recess. In order that one crimper bar can be substituted readily for another, as occasion may require, the crimper bar is held in place by a smooth headed pin 28, extended upwardly into a bore 29 in the offset 25 of the carrier 22, the pin being held in place by a set screw 30, threaded into the side of the offset 25, as Fig. 7 shows. The lower surface 31 of the crimper bar 26 has an upward and inward slant.

An inwardly inclined resilient tongue or retainer 32 is secured at 33 to the offset 25 of the carrier 22, the recess 27 in the crimper bar being adapted to receive the lower, outwardly inclined end of the tongue. One function of the tongue or retainer 32 is to exert pressure on the boxes, and prevent them from falling in an irregular manner, out of the machine. The part 32, however, has another and an equally or more important office. It keeps the flanges of the box forced inwardly, after the former 3 has been raised. Thus the edges of the flanges 6 and 7 of the box are kept well under and inclined toward the vertical center of the box next to follow. The result is that the box coming down with the former 3 will not tend to telescope into the box next below, which has been shaped. Such a telescoping sometimes happens in running different thicknesses of board on the same set-up, in the absence of the part 32.

Moreover, the resilient tongue 32 will force a box to adhere to the former 3, while the former is rising. Owing to such adherence, one may strip the box from the former at any desired place. The adherence is accomplished by the pressure of the part 32 against the box. There is increased resistance from the former 3, as an increased area of it comes into contact with the inner surface of the box. Thus, the box will slide up the tongue 32, and may be stripped off at any place. It is possible to raise the box the thickness of the rest plate 19, if desired.

Figure 1:
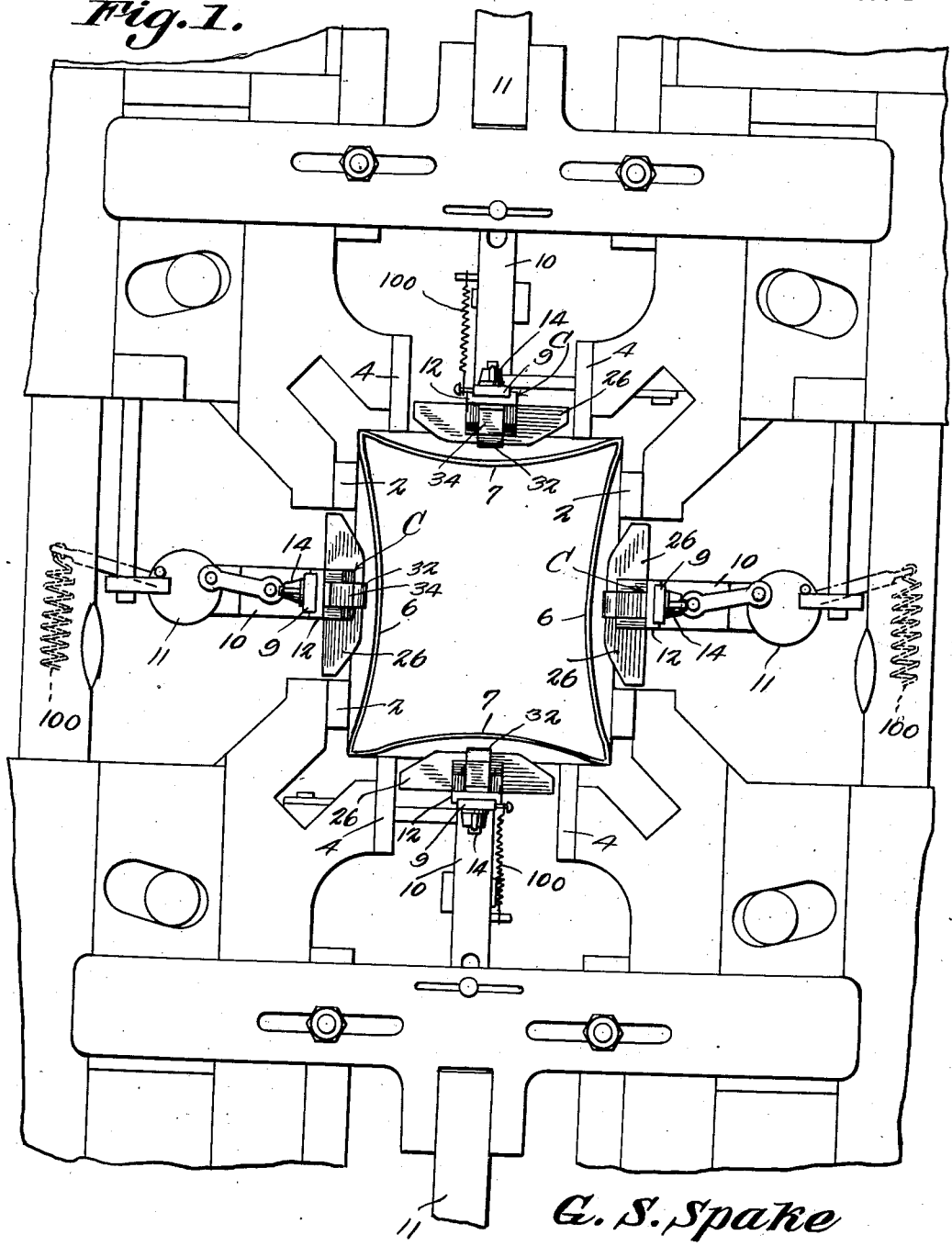
Fig. 1 shows in top plan, a standard machine wherewith the device forming the subject matter of this application has been assembled.

A downwardly extended and inwardly inclined tongue 34 is secured at 35 to the body 12 of the crimper C near the upper end thereof. The chief function of the part 34 is for the protection of the former 3, if spring 100, Fig. 1, breaks, or if there is a fouling of the machine by pieces of broken boxes or other trash. The member 34 serves to prevent box blanks or a partially completed box from catching on the wing nut 24 when the box is forced downwardly by the former 3.

When the parts 9—10 which carry the crimpers C are forced inwardly, the box is supported on the rest plates 19, the rest plates serving to carry downwardly the next box below and serving, also, to push inwardly on the walls of that box.

As to the box shown in Fig. 3, its walls or flanges are carried inwardly, at an acute angle to the bottom of the box, and when a box is discharged from the machine, its walls or flanges will be at right angles to the bottom of the box, as shown in Fig. 11, and not bowed outwardly, as shown in Fig. 12.

It is to be observed that, since the carrier 22 is vertically adjustable with respect to the body 12 of the former C, as shown in Fig. 6, the crimper bar 26 may be adjusted vertically, such an adjustment being necessary, at times, depending upon the height of the box which is being made.

The device is simple in construction, and will be found thoroughly advantageous for accomplishing the ends hereinbefore set forth: to wit, turning out a box of the sort depicted in Fig. 11, as distinguished from a box of the kind shown in Fig. 12.

Having thus described the invention, what is claimed is:

1. A shaper for use on a box-forming machine wherein the shaper has inward and outward movement to turn in the flange of a box, the shaper comprising an upstanding body provided at its lower end with a substantially horizontal rest, a crimper overhanging the rest, the lower surface of the crimper being disposed at an acute angle to the upper surface of the rest, thereby to bend a box flange inwardly at an angle to the bottom of a box, to such a degree of acuteness that when the flange is released, the flange will spring outwardly into rectangular relation to the bottom of a box, and means for mounting the crimper on the body for adjustment at the will of an operator, in a substantially vertical direction, toward and away from the rest.

2. A shaper for use on a box-forming machine wherein the shaper has inward and outward movement to turn in the flange of a box, the shaper comprising a body, a rest mounted on the body, a carrier, a crimper disposed above the rest, means for effecting a detachable and interchangeable connection between the crimper and the body, means for connecting the carrier to the body for adjustment, to vary the distance between the crimper and the rest, and a flange engaging box retainer mounted on the body, the retainer extending inwardly over the last-specified means, to guide a box blank clear of said means when the blank is forced downwardly upon the rest.

3. A shaper for use on a box-forming machine wherein the shaper has inward and outward movement to turn in the flange of a box, the shaper comprising a body, a rest mounted on the body, a carrier, a crimper disposed above the rest and mounted on the carrier, means for connecting the carrier to the body for adjustment, to vary the distance between the crimper and the rest, and a flange engaging box retainer mounted on the body, the retainer extending inwardly over the last-specified means, to guide a box blank clear of said means when the blank is forced downwardly upon the rest.

4. A shaper for use on a box-forming machine wherein the shaper has inward and outward movement to turn in the flange of a box, the shaper comprising a body, a rest mounted on the body, a carrier, a crimper disposed above the rest and mounted on the carrier, means for connecting the carrier to the body for adjustment, to vary the distance between the crimper and the rest, and a resilient box gripper having its upper end mounted on the carrier, the lower end of the gripper being disposed at the inner edge of the crimper.

5. A shaper for use on a box-forming machine wherein the shaper has inward and outward movement to turn in the flange of a box, the shaper comprising a body, a rest mounted on the body, a carrier, a crimper disposed above the rest and mounted on the carrier, means for connecting the carrier to the body for adjustment, to vary the distance between the crimper and the rest, a flange engaging box retainer mounted on the body, the retainer extending inwardly over the last-specified means, to guide a box blank clear of said means when the blank is forced downwardly upon the rest, and a resilient box gripper having its upper end mounted on the carrier, the lower end of the gripper being disposed at the inner edge of the crimper.

GEORGE SAMUEL SPAKE.